Patented Apr. 17, 1951

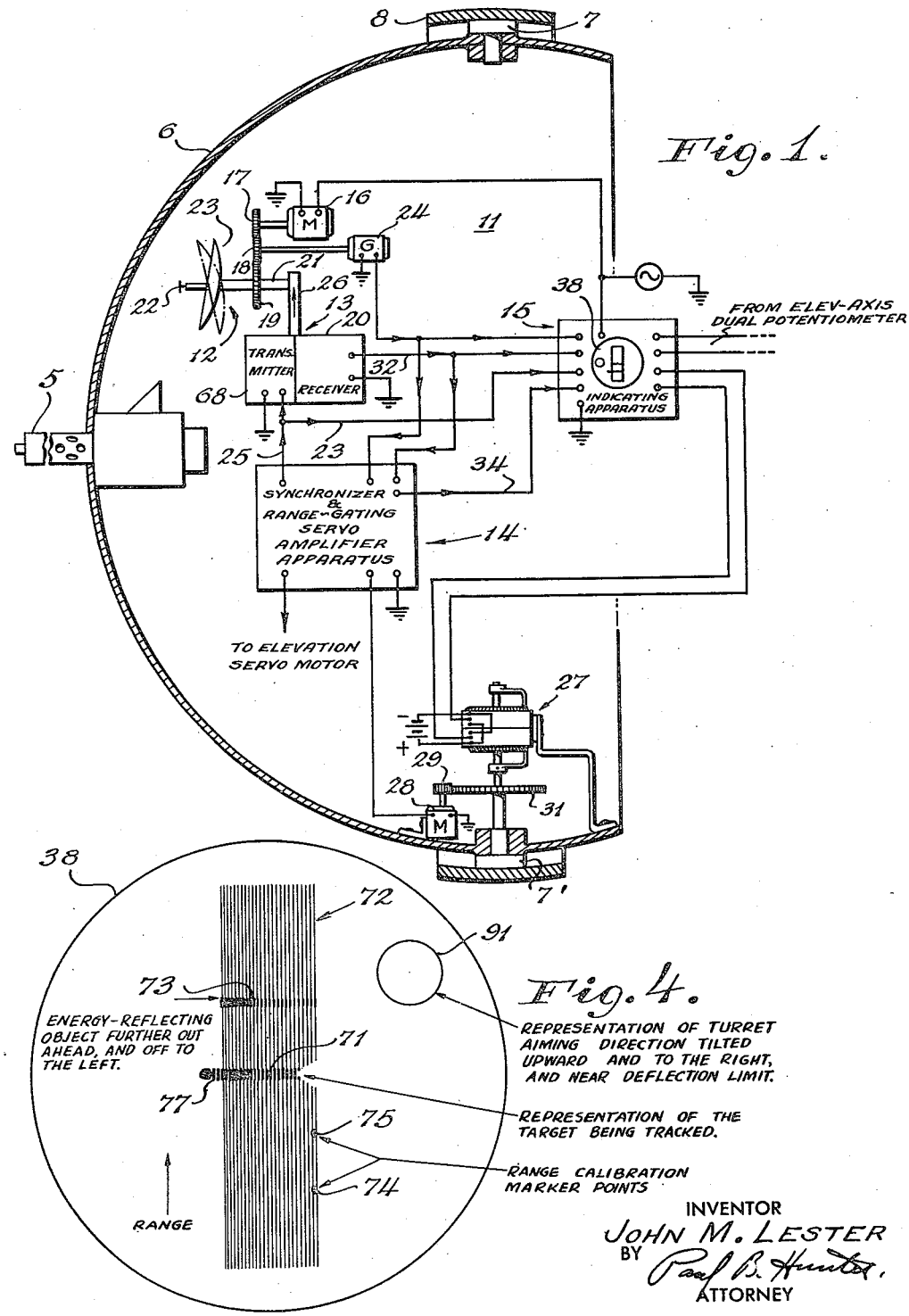

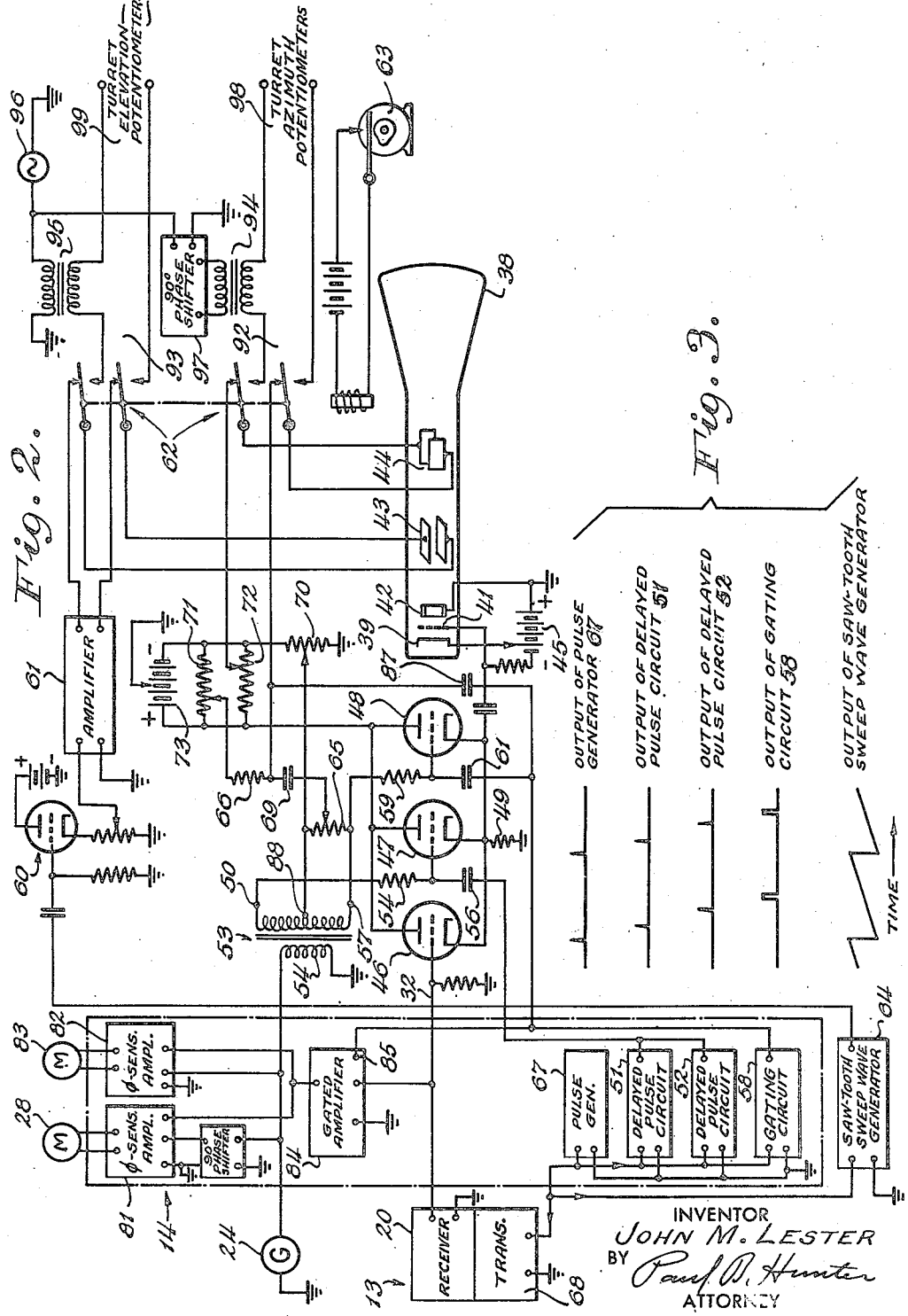

2,548,900

UNITED STATES PATENT OFFICE 2,548,900

DATA PRESENTATION APPARATUS

John M. Lester, Hempstead, N. Y., assignor to The Sperry Corporation, a corporation of Delaware Application June 12, 1946, Serial No. 676,199

16 Claims. (Cl. 343—11)

The present invention relates to apparatus and systems for presentation of an information pattern providing data as to the operation of electrical systems, and is particularly concerned with a system suitable for portraying a pattern which conveniently and unambiguously indicates the performance of a radio system such as a radar system or radio object detection system.

Radio transmitting and receiving systems have been arranged in various forms for determination of the direction of a remote object according to the direction of aiming of a directional antenna, and for determination of the distance of the object according to the propagation time required for transmitted radio energy to go to the object and for the energy reflected back by the object to return therefrom. Moreover, such systems have been provided with servo apparatus controlled by the reflected and received energy for automatically maintaining the directional antenna aimed generally toward a zone in which a detected object is moving. For this purpose, the directive antenna usually is periodically swept through a predetermined narrow range of scanning, e. g., through a very narrow conical scan range, in order to produce periodical strength variations of the received energy. The phase of these periodical strength variations indicates the direction of the energy-reflecting object relative to the predetermined narrow range of scanning of the directive antenna.

A radar system or radio object detection system servo-aligned with a selected target usually is referred to as a radar "tracking" system. Such a radar system has been incorporated in a movable gun unit for maintaining the gun aligned toward a target which is being tracked. For this purpose, compact radar system may be incorporated in a gun turret of a craft, and the servo mechanism controlled by the radar signals may position the turret, with guns and radar antenna affixed thereto, according to the direction of the target. Alternatively, the radar system may be external of the gun turret, and a self-synchronous positional repeater system may be employed for maintaining the turret and the radar antenna in parallel alignment, so that servo control according to the radar signals is simultaneously effective to maintain both the radar antenna and the guns aligned toward the target.

Where radar systems have been employed merely as wide-range searching devices, cathode ray indicators have been employed for portraying a pattern usually representing object distance versus direction. However, such indicators have not been found satisfactory as visual-indicating adjuncts to radar tracking systems.

It is an object of the present invention to provide an improved indicator system which will be suitable for use with radar systems, and particularly for use with a radar tracking system.

A further object is to provide indicating apparatus for presenting to a radar operator a readily understood pattern not only showing the distance of a selected object or target but also indicating whether the servo apparatus is controlled according to the direction of that object or target.

It is another object of the present invention to provide a radar indicator which not only apprises the operator of the distance of a remote object but also apprises him of the orientation of the radar system relative to limits upon the movement thereof.

An important object of the present invention is to provide improved apparatus for producing distinctive marker indications on the pattern of a cathode ray oscilloscope, at significant positions thereon.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In accordance with an important feature of the present invention, a cathode ray oscilloscope or like controllable pattern device is arranged for alternating deflection of the pattern-generating beam at a first frequency in a first component direction, e. g., in the horizontal direction, and for periodical deflection in a second component direction, e. g., in the vertical direction. The frequency of the sweep in the second component direction is different from the frequency of the sweep in the first component direction, so that the beam is swept through a predetermined pattern area. The sweep in the second component direction may be effected by application to a pair of electron beam deflection plates of a sawtooth wave wherein each cycle is initiated synchronously with the transmission of a pulse of energy by a pulse radar transmitter. Radar receiver output pulses may be employed to control the strength of the cathode ray beam, in such a way as to produce a distinctive image on the oscilloscope screen at a position indicative of target range. Distance reference marks for comparison with the position of an object-indicating image on the oscilloscope are provided, as along an edge of the pattern, at positions denoting predetermined distances. For example, a distinctive marker may be provided at a point representing a distance of 500 yards, and another may be provided as a point representing a distance of 1,000 yards. If energy pulses are reflected from the target at instants of different voltage values in the sweep circuit for the first component direction, a series of distinctive dots are formed on the screen of the indicator aligned in the first component direction, and appearing as a distinctive line across the pattern.

If a range gate system is employed in the radar apparatus for confining control of the radar-directing servo system to signals corresponding in time-phase to a predetermined object distance, that object distance may be denoted by a still further marker appearing at a predetermined part such as an edge of the pattern. There may also be presented on the cathode ray oscilloscope screen a marker indicating the direction of aiming of the radar apparatus relative to the limits of a predetermined range of movability thereof. This feature is particularly helpful where the radar system is employed for directing a gun turret on a craft toward a chosen target. It gives an operator, whose attention is rigidly fixed on the indicator, a warning before the tracking is stopped by an encounter of the gun turret with a limit stop.

The above objects and features will be more fully understood and other objects will be made apparent by reference to the following detailed description, viewed in conjunction with the drawings, wherein:

Fig. 1 is a schematic illustration of a radar system embodying the present invention and incorporated within a substantially hemispherical gun turret of a type commonly employed on aircraft;

Fig. 2 is a circuit diagram of the radar indicator apparatus embodied in Fig. 1;

Fig. 3 is a group of graphs indicating the time relations between the outputs of synchronized signal units shown in Fig. 2; and, Fig. 4 is an illustration of a pattern produced on the cathode ray oscilloscope by the apparatus shown in Figs. 1 and 2.

Referring now to Fig. 1, there is shown an aircraft gun turret 6 to which is affixed a machine gun 5 for firing upon enemy craft. The gun 5 may be rigidly connected to the turret, or it may be movable through a very narrow range relative to the turret according to target prediction. The turret 6 is pivoted about vertical-axis bearings 7, 7' in a gimbal ring 8, which in turn may be pivoted in horizontal-axis bearings (not shown) affixed to the craft. Such pivotal mountings of the turret are provided for universal movement or change of orientation thereof within a predetermined limited range of movement relative to the craft. Such change of orientation is necessary to allow for maintaining the gun 5 aimed generally toward any target within a relatively great range of directions.

A radar system 11 is shown incorporated in the turret 6. This radar system includes a directive antenna 12 composed of an exciter unit 22 and a paraboloidal reflector 23. The exciter 22 may be coupled through a high frequency conduit 21 and a further conduit 26 to a radio unit 13 including an ultra high frequency pulse transmitter section 68 and a pulse receiver section 20. The antenna 12 is regularly rotated by a motor 16 about the axis of conduit 21; and the exciter unit 22 may be positioned at a point slightly removed from the focus of the paraboloidal reflector 23, or the paraboloidal reflector 23 may be tilted slightly from alignment of its axis with the conduit 21, in order to make the directive pattern of the antenna 12 slightly divergent from the axis of rotation of the antenna. Accordingly, motor 16 causes regular conical scanning of the directive pattern of the antenna 12. The frequency at which radio energy pulses are transmitted far exceeds the frequency or speed of rotation of the antenna 12, so that several pulses are transmitted during each revolution of the antenna and thus during each scan cycle. The periodical movement or scanning of the antenna directive pattern throughout a predetermined locus such as a conical locus produces corresponding periodical variations of the output strength from receiver 20 when a radar energy-reflecting remote object is in a direction slightly divergent from the direction of the axis of rotation of the antenna 12. Such variation of the output signals from receiver 20 is compared in electronic apparatus 14 with the output of a phase reference generator 24 coupled to the antenna 12, and the electronic apparatus 14 is employed to drive a pair of turret orientation control servomotors, one of which, servomotor 28 is shown in Fig. 1 coupled through gears 29 and 31 to drive the turret 6 about the axis of bearings 7, 7'.

According to a major feature of the present invention, there is provided an improved indicating apparatus 15 for supplying the operator with a pattern clearly indicating the overall performance of the radar system, as well as the position of the turret 6 relative to its limited range of movement within the craft. This improved indicating apparatus 15 cooperates with the receiver 20, the phase reference generator 24, the electronic apparatus 14, and turret position signal generating devices, for indicating to the operator the distance of each target or energy-reflecting object in the zone through which the rotation pattern of the antenna 12 is swept by the rotation thereof, the orientation of the turret 6, the target distance discrimination exercised by electronic apparatus 14 to provide servo control of the turret 6 according to a target at a predetermined distance, and the azimuthal orientation of the other targets in the directive zone covered by the regularly rotated antenna 12, relative to the axis of rotation of the antenna.

Referring now principally to Fig. 2, there is shown a cathode ray tube 38 which may be employed as the data presentation device of the indicating apparatus 15. The cathode ray tube 38 includes a cathode 39, a control electrode or grid 41, an electron beam accelerating electrode or anode 42, and component direction beam deflecting means such as pairs of electrostatic deflection plates 43 and 44, e. g., arranged for vertical and horizontal deflection of an electron beam formed by cathode 39 and anode 42. A battery 45 may be connected to the electrodes 39, 41, and 42 for applying thereto proper operating voltages for the cathode ray tube 38. The control electrode or grid 41 is incorporated within cathode ray tube 38 for controlling the intensity of the electron beam directed from cathode 39 through the anode 42 toward the fluorescent screen of the tube. An electronic mixer circuit including three electron discharge devices such as vacuum tubes 46, 47 and 48 may be arranged with a common output resistor such as a common cathode resistor 49 for controlling the potential of the control electrode 41, and thus for varying the intensity of the electron beam of the cathode ray tube 38 in response to current flow through any of the three mixer tubes.

A version of the phase reference voltage produced by generator 24 may be supplied through a transformer 53 and resistance-capacitance coupling circuits including a potentiometer 65, a capacitor 69, a resistor 66, a potentiometer 70 and a dual potentiometer unit 71, 72 to the horizontal deflection plates 44 of the cathode ray tube 38. This version of the phase reference voltage is employed to sweep the electron beam in the tube 38 periodically in a first component direction, e. g., in the horizontal direction, in synchronism with a component such as the horizontal component of motion of the antenna 12 resulting from rotation thereof by motor 16.

A version of a saw-tooth wave voltage produced by a saw-tooth sweep wave generator 64 may be amplified in amplifier stages 60 and 61 and supplied to the second component direction sweep controller, i. e., the vertical deflection plates 43 of the cathode ray tube 38. The saw-tooth sweep wave generator 64 and the radar pulse transmitted 68 are synchronized, each of these units being controlled by periodical timing pulses supplied from a timing pulse generator unit 67. Accordingly, the electron beam of the cathode ray tube 38 is swept vertically upward immediately following the transmission of each brief pulse of radio energy toward a remote object. As a result of the vertical sweeping of the beam at relatively high frequency and the horizontal sweeping at relatively low frequency, the electron beam is regularly scanned throughout a predetermined area such as a substantially rectangular area 72 on the cathode ray tube screen, as shown in Fig. 4.

The radar receiver 20 is coupled to the control electrode of electron discharge device 46 for producing a beam intensifying voltage pulse across resistor 49, and hence, between the control electrode 41 and the cathode 39 of the cathode ray tube 38, in synchronism with the reception of an energy pulse reflected back from an energy reflecting object or target. Accordingly, a bright mark is made to appear on the screen of the cathode ray tube 38 at a height thereon corresponding to the distance of the remote object. Moreover, if the direction of the remote object substantially coincides with the direction of the axis of rotation of the antenna 12, so that the strength of the signals received by receiver 20 does not vary appreciably according to the rotation of the antenna 12, then the impulses produced by the receiver 20 are substantially uniformly effective in controlling the cathode ray tube grid 41 throughout the cycles of the alternating voltage version supplied from the phase reference generator 24, and consequently, a substantially uniform horizontal line as illustrated at 71 in Fig. 4 is produced at a height in the area 72 corresponding to the distance of the energy reflecting object.

In the event that there is a further object within the narrow zone through which the directivity pattern of antenna 12 is periodically scanned by the motor 16, e. g., an object at a greater distance than the object represented by line 71, such an object will be represented by a further horizontal line across the area 72. However, if this further object is not precisely on the line defined by the axis of rotation of the antenna 12, but is instead somewhat azimuthally displaced therefrom, to the right or to the left, then the line representing that object will not be of uniform intensity across the pattern 72, but will be tapered in such a direction as to indicate the direction of divergence of the further target. Such a line may be as shown at 73 in Fig. 4, this line being illustrated as above line 71, and thus as representing a more distant object; and being of maximum intensity at the left-hand side of the area 72, indicating an object direction to the left of the direction along which the gun 5 is aimed.

In order to facilitate the estimation of the distance of energy reflecting targets, distance calibration marks are provided at significant points on the oscilloscope pattern, as for example, on the right-hand edge of the rectangular area 72, by the connection of one of the mixer tubes, e. g., tube 47, for control thereof jointly in accordance with a version of the phase reference generator output voltage and the output voltage of a plurality of delayed pulse circuits 51 and 52. These delayed pulse circuits may incorporate variable phase shifters and synchronized pulse generators, or they may comprise delay lines of effective length corresponding to the desired time delay values according to the distances to be represented by the markers, e. g., distances of 500 yards and 1000 yards, as represented by marker dots 74 and 75 in Fig. 4. The delayed pulse circuits 51 and 52 are timed by the pulse generator 67, and their output circuits are coupled to the control electrode of tube 47 through a grid coupling capacitor 56, across which is developed a bias voltage tending to hold the control electrode biased well beyond the plate current cut-off point. A resistor 54 is connected between the control electrode of tube 47 and an output terminal 50 of the transformer 53.

When terminal 50 is near its maximum positive voltage excursion, and the electron beam of oscilloscope 38 is accordingly swept substantially to its maximum deflection to the right, the control electrode of tube 47 is barely biased to cut-off potential by the voltage stored across capacitor 56. During this time interval of maximum positive voltage at terminal 50, the pulses from delayed pulse circuits 51 and 52 are effective to cause output current pulses through tube 47, and accordingly to cause momentary intensification of the electron beam in the cathode ray tube 38 at predetermined intervals after the initiation of the vertical sweep saw-tooth cycles, and thus when the beam is swept to predetermined heights along the right-hand edge of the area 72. The fixed output phase relations of pulse generator 67, the delayed pulse circuits 51 and 52, and the saw-tooth wave generator 64 are indicated by the correspondingly labeled plots in Fig. 3.

The control voltages for the servomotors 28 and 83 are supplied by phase sensitive amplifiers 81 and 82, respectively, and these amplifiers are each jointly responsive to the output of the radar receiver 20 and a version of the alternating voltage from phase reference generator 24. One of the amplifiers is supplied with a direct voltage version by generator 24, while the other is supplied with a version shifted through 90°. Where there is some likelihood that a plurality of targets may be within the effective zone of antenna 12, it is desirable that the servo mechanism be made to exercise control of the orientation of turret 6 only according to the variations of those reflected and received impulses corresponding to a selected target, usually the nearest target. For this purpose, phase sensitive amplifiers 81 and 82 employed for controlling servomotors 28 and 83 are coupled to the receiver 20 through a gated amplifier 84 which is effective only during application of a control or "gating" voltage to a terminal 85 thereof. This voltage may be supplied by a variable delay pulse generator 58, referred to as a gating circuit, and timed according to a selected phase delay from the output of the pulse generator 67. Gated amplifiers are shown and described in U. S. patent application Serial No. 506,361, Daniel S. Pensyl, filed October 15, 1943, now Patent No. 2,443,195 issued June 15, 1948. A gated amplifier employed in a servo-controlled radar system is shown in U. S. patent application Serial No. 452,818, Isbister et al., filed July 30, 1942, now Patent No. 2,542,032 issued February 20, 1951. The phase relation of the output of gating circuit 58, and hence, the range or target distance according to which the servo mechanism is made effective, may be indicated on the oscilloscope pattern by a further marker 77 (Fig. 4).

The marker 77 may be produced similarly to range markers 74 and 75, but may be placed at the opposite edge of the area 72, for contrast, by controlling the grid or control electrode of mixer tube 48 jointly according to an output voltage version at terminal 57 of transformer 53 and the output of gating circuit 58. For producing the marker 77 at the left-hand edge of the area 72, a resistor 59 may be employed to couple the grid of tube 48 to terminal 57 of the transformer 53, so that the tube 48 is rendered subject to current pulse production only during voltage maxima of generator 24 opposite those at which the tube 47 is made effective. When a target-representing line, e. g., line 71 (Fig. 4), is in registry with the range marker 77, the operator is apprised that the gate timing for the servo mechanism corresponds to the range of that target, and accordingly, that the servo mechanism including motors 28 and 83 operates only according to variations of the signals received from that target.

Since the marker 77 often appears at one end of a horizontal line representing a target, some difficulty may be experienced in distinguishing a mere dot at the left-hand edge of area 72 from the target-representing line in registry therewith. Accordingly, the marker 77 can be made particularly distinct, by causing it to extend somewhat beyond the edge of area 72 as shown in Fig. 4. This is accomplished by sweeping the cathode ray beam beyond the left-hand edge of the area according to the output pulses from the gating pulse circuit 58. For this purpose, a capacitor 87 having a very low capacitance value may be connected between the output terminal of gating pulse circuit 58 and the left-hand plate of the horizontal deflection plates 44.

For indicating the orientation of the turret 6 (Fig. 1) relative to the limited range of movement of the turret within the craft, a movable distinctive marker such as a circle 91 (Fig. 4) may be made to appear as part of the pattern produced on the screen of the oscilloscope 38. This circle may be generated by transferring the beam deflection control of the deflection circuits 43 and 44 periodically from the saw-tooth vertical sweep circuit 64, 60, 61 and the horizontal sweep circuit 24, 53, 65, 66, 69, 70, 71, 72 over to a pair of circle generation and positioning voltage circuits.

The periodical transfers of the deflection circuits may be accomplished by a relay 62 periodically energized during brief intervals by a cam switch motor 63. Through the relay 62, the deflection circuits are connected during these intervals to supply circuits 92 and 93 wherein are produced quadrature-phase alternating components for generation of the circle image, and direct voltages indicating the azimuthal and elevation components of turret orientation. The alternating voltage components may be supplied to circuits 92 and 93 through transformers 94 and 95, respectively, transformer 94 being coupled to a relatively high frequency alternating voltage generator 96 through a 90° phase shifter 97 and transformer 95 being directly connected to the generator 96. Circuits 92 and 93 further include input terminal pairs 98 and 99, respectively, for connection to dual potentiometers arranged at the gimbal journals in the supporting system of the turret 6 (Fig. 1), the dual potentiometer unit for producing turret azimuthal position voltage being illustrated at 27 in Fig. 1. By virtue of this arrangement, the circle 91 formed on the screen of the cathode ray tube 38 is deflected vertically according to the direct voltage produced at terminals 99 by an elevation dual potentiometer unit (not shown), and deflected horizontally according to the direct voltage produced by the turret azimuth dual potentiometer unit 27.

By reference to the pattern on the screen of the cathode ray tube 38, the radar operator is informed as to all of the essential facts for insuring proper operation of the radar system. The interrelation of the picture elements shows which of a plurality of targets determines the tracking movements of the radar system, and also depicts the range of that target as well as other targets. The range or distance reference marks in the pattern are so generated as to distinguish them clearly from the object images, and yet to provide for convenient positional comparison of the reference marks and the images. The operator can concentrate his attention fully on the oscilloscope screen, since the approach of the radar system, gun and turret assembly to a limit stop is indicated by the approach of the circular mark on the screen toward the border of the oscilloscope screen.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radar system embodying periodical radio pulse transmitting and receiving apparatus and antenna means coupled to said apparatus for production of periodical receiver output pulses due to radio energy propagated to a distant object and reflected therefrom, said receiver output pulses being delayed after the pulse transmissions by a time interval corresponding to the distance of said remote object, performance indicating apparatus comprising: a cathode ray oscillograph arranged for generation and intensity control of a spot-illuminating beam and for vertical and horizontal deflection of said beam, alternating voltage means for producing periodical horizontal movement of said beam of a predetermined amplitude, means coupled to said periodical radio pulse transmitting and receiving apparatus for sweeping said beam vertically in synchronism with the transmission of radio pulses, means for varying the intensity of said beam according to variations of receiver output voltage whereby an object reflecting radio energy pulses is represented by a horizontal line of extent limited according to said predetermined amplitude, the vertical position of said line being representative of distance of the energy reflecting object, means synchronized with said beam sweeping means for producing voltage impulses in predetermined phase relation with the vertical movement of said beam, and means jointly responsive to said impulse producing means and to said alternating voltage means for momentarily changing the intensity of said beam in predetermined phase relations with both the horizontal and vertical movements of said beam, whereby a distinctive mark is produced at a predetermined point on said screen for positional comparison with said object-representing line.

2. The apparatus as defined in claim 1, wherein said means jointly responsive to said impulse producing means and said alternating voltage means comprises means for momentarily extending the horizontal movement of said beam beyond the limit corresponding to said predetermined amplitude.

3. In a system for retaining a directional device aimed toward a movable object, including a radar system embodying periodical radio pulse transmitting and receiving apparatus and directive antenna means coupled to said apparatus and periodically scanning throughout a predetermined zone of directions for producing periodical variation of intensity of the radio energy pulses received from a remote object as a result of energy pulses transmitted thereto, said periodical variation of intensity of the radio energy pulses being indicative of the direction of said object relative to said predetermined zone, said system further including servo apparatus for shifting said antenna means and said directional device according to the phase and amplitude of said pediodical variation of intensity of energy pulses received from said remote object, the performance indicating apparatus which comprises: a cathode ray oscilloscope arranged for production and intensity control of a spot-illuminating beam and for vertical and horizontal deflection of said beam, alternating voltage means for producing periodical horizontal movement of said beam of a predetermined amplitude and at periodicity different from the periodicity of radio pulse transmission by said radar apparatus, means coupled to said periodical radio pulse transmitting and receiving apparatus for sweeping said beam vertically in synchronism with the transmission of pulses, means for varying the intensity of said beam according to variations of receiver output voltage whereby an object reflecting energy pulses is represented by a horizontal line of extent corresponding to said predetermined amplitude, the vertical position of said line being representative of the distance of the energy reflecting object, means synchronized with said beam sweeping means for producing voltage impulses at the periodicity of said transmitted radio pulses and in predetermined phase relation therewith, means synchronized with said impulse producing means and interposed between said transmitting and receiving apparatus and said servo apparatus for limiting the control of said servo apparatus to receiver output pulses coincident with said generated impulses, and means jointly responsive to said voltage means for momentarily changing the intensity of said beam in predetermined phase relations with both the horizontal and vertical movements of said beam, whereby a distinctive marker is produced at a point on said screen for contrast to and for positional comparison with said object-representing line, so that said servo apparatus is controlled only by such an object as is represented by a line at the horizontal position of said distinctive marker.

4. In a system for retaining a directional device aimed toward a movable object, including a radar system embodying periodical radio pulse transmitting and receiving apparatus and directive antenna means coupled to said apparatus and periodically scanning throughout a predetermined zone of directions for producing periodical variation of intensity of the radio energy pulses received from a remote object as a result of energy pulses transmitted thereto, said periodical variation of intensity of the radio energy pulses being indicative of the direction of said object relative to said predetermined zone, said system further including servo apparatus for shifting said antenna means and said directional device according to the phase and amplitude of said periodical variation of intensity of energy pulses received from said remote object, performance indicating apparatus as defined in claim 3, further including means for periodically shifting the horizontal and vertical deflection control of said oscillograph from said alternating voltage means and said beam sweeping means to apparatus for producing on said cathode ray oscillograph a further marker indicating the direction of aiming of said directional object.

5. In a radar system embodying periodical radio pulse transmitting and receiving apparatus and directive antenna means coupled to said apparatus and for periodically scanning throughout a predetermined zone for producing periodical variation of intensity of the energy pulses received from a remote object as a result of energy pulses transmitted thereto, performance indicating apparatus comprising: a cathode ray oscilloscope arranged for generation and intensity control of a spot-illuminating beam and for vertical and horizontal deflection of said beam, alternating voltage means synchronous with the scanning of said directive antenna means for producing periodical horizontal movement of said beam of a predetermined amplitude, means coupled to said periodical radio pulse transmitting and receiving apparatus for sweeping said beam vertically in synchronism with the transmission of pulses, means for varying the intensity of said beam according to variations of receiver output voltage whereby an object reflecting energy pulses of strength varying according to the periodical variation of direction of said antenna means is represented by a horizontal line of extent corresponding to said predetermined amplitude and of intensity tapered according to the periodical variation of strength, and whereby an object reflecting energy pulses of strength independent of the periodical variation of direction of said antenna means is represented by a substantially uniform horizontal line of extent corresponding to said predetermined amplitude, the vertical positions of said lines being representative of distance of the energy reflecting objects, means synchronized with said beam sweeping means for producing voltage impulses in predetermined phase relation with the vertical movement of said beam, and means jointly responsive to said voltage impulse producing means and to said alternating voltage means for momentarily changing the intensity of said beam in predetermined phase relations with both the horizontal and vertical movements of said beam, whereby a distinctive marker is produced at a predetermined point on said screen for contrast to and for positional comparison with each object-representing line.

6. A cathode ray indicator system comprising a cathode ray oscilloscope arranged for generation and intensity control of a spot-illuminating beam and for deflection thereof in first and second component directions, means including a first alternating voltage generator for periodically sweeping said beam in said first component direction at a first frequency, means including a second alternating voltage generator for periodically sweeping said beam in said second component direction at a second frequency different from said first frequency, and means coupled to said first and second periodically sweeping means and jointly responsive to said first and second voltage generators for momentarily increasing the intensity of said beam in fixed phase relation with both of said first and second alternating voltages for producing a bright marker spot at a predetermined position on said oscilloscope.

7. A cathode ray indicator system comprising a cathode ray oscilloscope arranged for deflection and intensity control of a spot illuminating electron beam and for deflection thereof in first and second component directions, first means for periodically sweeping said beam in said first component direction at a first frequency, second means for periodically sweeping said beam in said second component direction at a frequency different from said first frequency, whereby said beam is swept throughout a predetermined area, and means for producing a mark at a predetermined point at the border of said area, said last-named means comprising means coupled to said first and second sweeping means and timed in synchronism with maximum beam deflection by said first sweeping means and controlled in predetermined phase relation with said second sweeping means intermediate the sweep limits thereof to cause said mark to appear at said predetermined point.

8. A cathode ray indicator system as defined in claim 7, wherein said means for producing a mark comprises means for extending the deflection of said beam beyond the border of said area.

9. A cathode ray indicator system as defined in claim 7, wherein said means for producing a mark comprises means for producing a momentary excursion of said beam beyond the border of said area and simultaneously intensifying said beam.

10. A cathode ray indicator system as defined in claim 7, wherein said means for producing a mark comprises means for producing a momentary change of intensity of said beam.

11. A cathode ray indicating system comprising a cathode ray oscilloscope arranged for deflection and intensity control of a spot-illuminating beam and for deflection thereof in first and second mutually transverse component directions, means for periodically sweeping said beam in said first component direction at a first frequency, means for periodically sweeping said beam in said second component direction at a second frequency different from said first frequency, said beam being regularly swept through an area pattern by said first and second component direction sweeping means, and means jointly responsive to said first and second periodically sweeping means and operative only at the instants of maximum deflection of said beam by said first periodically sweeping means for momentarily increasing the intensity of said beam in predetermined phase relation with said second periodically sweeping means for producing a marker spot at a predetermined position on an edge of said pattern.

12. A cathode ray indicator comprising a cathode ray oscilloscope arranged for deflection and intensity control of a spot-illuminating beam and for deflection thereof in first and second component directions, first means for periodically sweeping said beam in said first component direction at a first frequency, second means for periodically sweeping said beam in said second component direction at a second frequency different from said first frequency, means jointly responsive to said first and second periodically sweeping means for momentarily increasing the intensity of said beam in predetermined phase relation with both of said periodically sweeping means for producing a bright marker spot at a predetermined position on said oscilloscope, and means for producing a shift of the intensity of said beam synchronously with the sweep of one of said periodically sweeping means through a line parallel to one of said component directions for producing a distinctive line for positional comparison with said marker spot.

13. A cathode ray indicator system comprising a cathode ray oscilloscope arranged for deflection and intensity control of a spot-illuminating beam and for deflection thereof in first and second component directions, first means for periodically sweeping said beam in said first component direction at a first frequency, second means for periodically sweeping said beam in said second component direction at a second frequency different from said first frequency, first means jointly responsive to said first and second periodically sweeping means for momentarily intensifying said beam in fixed phase relation with both of said periodically sweeping means for producing a distinctive marker spot at a predetermined position on said oscilloscope, second means jointly responsive to said first and second periodically sweeping means for momentarily intensifying said beam in a second phase relation with both of said periodically sweeping means for producing a distinctive marker spot at a further position on said oscilloscope, and means for producing a shift of the intensity of said beam synchronously with the passage thereof through a line on said oscilloscope and thereby producing a distinctive line indication on said oscilloscope for positional comparison and contrast with said marker spots.

14. A cathode ray indicator system as defined in claim 13, wherein said first intensifying means comprises means for intensifying said beam only at one extreme of the sweep in said first component direction, and said second intensifying means comprises means for intensifying said beam only at the opposite extreme of the sweep in said first component direction.

15. A cathode ray indicator system as defined in claim 13, wherein said first intensifying means and said second intensifying means comprise means for increasing the intensity of said beam at corresponding extremes of the sweep in said first component direction, but at different phase relations with respect to the sweep in said second component direction.

16. A cathode ray indicator system as defined in claim 13, wherein said first intensifying means comprises means for momentarily extending the sweep of said beam in said first component direction simultaneously with the intensification thereof.

JOHN M. LESTER.

REFERENCES CITED

The following references are of record in the file of this patent:

UNITED STATES PATENTS

| Number | Name | Date |
|---|---|---|
| 2,192,121 | Bedford | Feb. 27, 1940 |
| 2,406,858 | Shepard | Sept. 3, 1946 |
| 2,408,050 | De Rosa | Sept. 24, 1946 |
| 2,424,984 | Hoffman | Aug. 5, 1947 |
| 2,425,330 | Kenyon | Aug. 12, 1947 |
| 2,426,182 | De Lange | Aug. 26, 1947 |
| 2,427,905 | Fyler | Sept. 23, 1947 |
| 2,446,024 | Porter | July 27, 1948 |